June 8, 1954  G. L. MEYERS  2,680,700
LAMINATED SHEET MATERIAL AND METHOD OF MAKING SAME
Filed Sept. 26, 1950  2 Sheets-Sheet 1
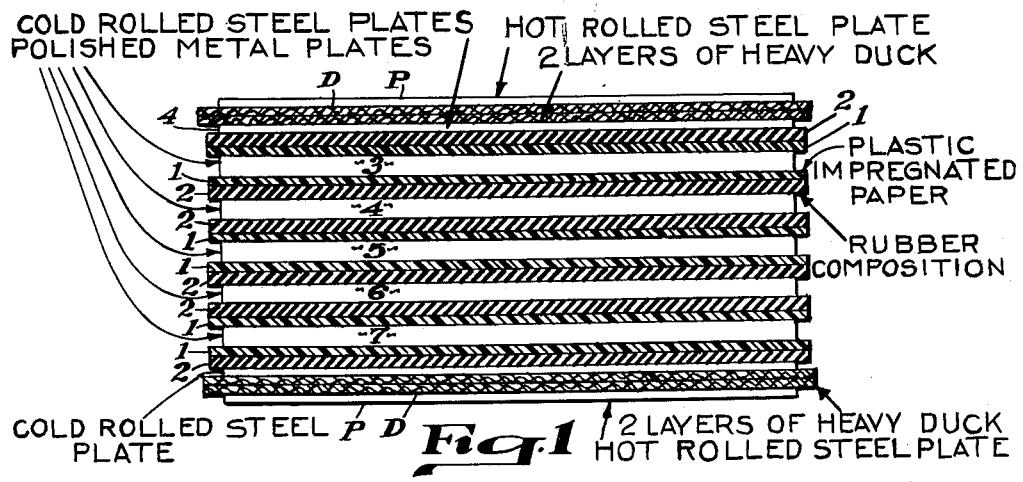
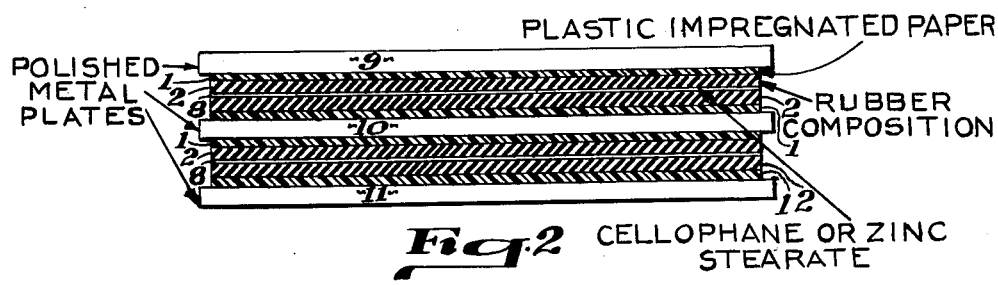
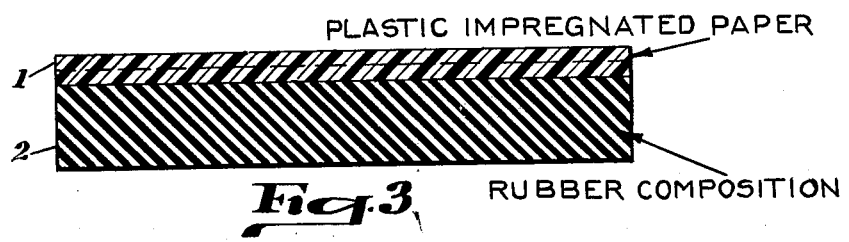
INVENTOR.
GEORGE L. MEYERS.
BY
Oberlin & Limbach
ATTORNEYS.

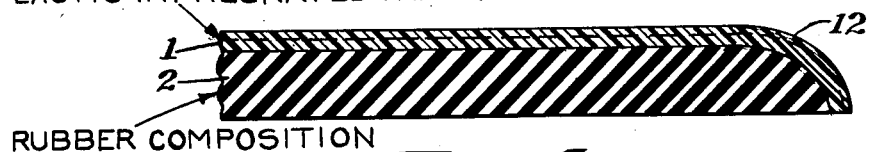

Patented June 8, 1954

2,680,700

UNITED STATES PATENT OFFICE 2,680,700

LAMINATED SHEET MATERIAL AND METHOD OF MAKING SAME

George L. Meyers, Willoughby, Ohio, assignor, by mesne assignments, to The Eagle-Picher Company, Cincinnati, Ohio, a corporation of Ohio Application September 26, 1950, Serial No. 186,822

13 Claims. (Cl. 154—139)

This invention relates as indicated to laminated sheet material and, more particularly, to a thin resin-surfaced sheet material having a rubber backing adhered thereto.

In the past few years, various types of laminated sheet materials have been widely employed to surface such articles as desks, tables, bars, lunch counters and the like to afford an attractive facing which may readily be cleaned and which is adapted to withstand stains, cigarette burns and the like. Such sheet materials have generally been relatively thick and rigid, requiring special filler materials and adhesives to secure the same to the supporting surface. In one form, the surface layers of the laminate may comprise a thin film of a synthetic plastic or resin such as the phenol-formaldehyde type overlying an incorporated layer of decorative paper stock and mounted upon relatively thick backing material. In some instances a sheet of aluminum foil has been included beneath such layer of decorative paper to act as a heat dissipating medium whereby the plastic surface material may be protected from damage by lighted cigarettes and other hot objects, the heat therefrom being dissipated by such aluminum foil before substantial damage to the plastic surface takes place. Various other known resins ordinarily of the thermosetting type have likewise been employed such as the urea formaldehyde resins and the melamine formaldehyde resins and combinations of various such resins.

Laminated plastic surfaced sheet materials of the type indicated have been quite expensive since not only do they employ a considerable percentage of the synthetic plastic material but also skilled artisans are required properly to cut and lay the same. Since the surfaces to which the sheets are adhered are usually not perfectly flat and the sheets are relatively stiff and inflexible, there has been a considerable tendency for such sheets to pop up in local areas. It has also not been generally practicable to produce single sheets of this type of large dimensions.

It is a principal object of the present invention to provide a laminated sheet having a thin surface layer of synthetic plastic and a thin (but relatively thick compared to the plastic layer) layer of a rubber backing material bonded thereto.

It is a further object to provide such laminated sheet material which will be highly decorative in appearance, resistant to cigarette burns and the like, and afford sound deadening characteristics.

Still another object is to provide such laminated sheet material which will be inexpensive, flexible, and easy to mount securely upon a supporting surface.

A further object is to provide such sheet material which may be molded and shaped to desired conformation.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a vertical elevational diagrammatic showing of one method of forming the laminated sheet material of my invention;

Fig. 2 is a view similar to Fig. 1 but illustrating a somewhat modified method of forming such sheets;

Fig. 3 is an enlarged diagrammatic view in cross-section illustrating the general assemblage of the components of my laminated sheet material;

Fig. 4 is a view similar to Fig. 3 but illustrating the manner in which a feather edge may be molded to the sheet;

Fig. 5 is an exploded diagrammatic view illustrating a typical arrangement of component layers of sheet material adapted to be laminated and molded together in accordance with my invention;

Fig. 6 is a view similar to Fig. 3 but showing a form of my new laminated sheet material having a plastic surface on both sides thereof; and Fig. 7 illustrates material of the Fig. 3 type mounted on a thin metal sheet suitable for subsequent bending to desired conformation.

I am aware that synthetic plastic surfacing materials have previously been applied to certain types of rubber backing. Such rubber backings have, however, generally either been relatively thick and rigid or have merely comprised rubber cement or like bonding material for securing the sheet to a supporting surface. No large thin flexible rubber sheets suitable for surfacing tables and the like have previously been available provided with a thin decorative synthetic plastic surface layer. Rubber compositions, both natural and synthetic are, of course, very much less expensive than such plastic materials so that it is desirable to employ only as much of the plastic material as may be necessary to afford the desired surface characteristics. Numerous difficulties are encountered, however, when it is attempted to mold a composite laminated sheet comprising a rubber backing and a relatively thin layer of such plastic.

It is not economically feasible to mold such composite article in the form of large sheets within closed molds since the cost of the necessary molds and the handling of the same is prohibitive. On the other hand, the usual rubber or rubber-like compositions suitable for the formation of large flexible sheets have flow characteristics (prior to vulcanization or curing) rendering it difficult to apply and bond a relatively thin plastic surface layer thereto under pressure without excessive flow of such rubber.

I have found that if a rubber backing composition is employed having relatively low flow properties it is possible to bond a thin plastic surface layer thereto without the necessity of utilizing the conventional forms or frames since there will be relatively little spreading action of the same under pressure. Such rubber composition should, however, be capable of a certain small degree of flow in its uncured state since the amount of pressure required to obtain a good bond between the rubber and plastic is thereby reduced and a superior surface finish may be obtained on the exposed plastic surface under relatively low pressures due to the fact that the underlying rubber layer is capable of yielding to some extent. The necessity for absolutely perfect press platens is thereby accordingly avoided. The rubber backing composition should have a curing rate corresponding reasonably closely to that of the plastic surfacing material in order to obtain superior surface finish and strength. Such backing material should also, of course, be compatible with the synthetic plastic or resin of the surfacing material in order to obtain maximum adhesion between the plies and to prevent the formation of blisters between such plies during curing.

The thickness of the layer of rubber backing material should likewise be held within certain limits since a certain minimum thickness will afford maximum impact strength. Thus, if the underlying generally resilient layer of rubber composition in the finished article is too thick, it will deform excessively under impact beyond the resilient limits of the thin plastic surface layer, permitting fracture of the latter. Additionally, the thinner such backing layer, the smaller the radius of bending which may be achieved on outside bends as when the finished article is to be mounted on a supporting surface including a relatively sharp outside corner. In order to bond the layers of my new laminate together under pressure but without entirely enclosing the same within a closed mold, it is likewise desirable that such backing layer be of a certain minimum thickness to keep lateral flow of such material under pressure to such a small degree that no lateral confinement of the same is necessary.

The cured rubber backing layer of the finished article should have a certain minimum hardness to avoid brittleness and afford a degree of flexibility. In fact, in the preferred embodiment of my invention such backing layer should possess a very high degree of flexibility. Such minimum hardness characteristic, furthermore, facilities cutting of my sheet material to desired shapes and sizes without the employment of the special tools commonly necessary for cutting prior art surfacing materials. The sulphur content of hard rubber compositions also tends to affect the thin resin coating layer resulting in excessive brittleness of the same. Of course, the backing layer in the finished article should not be too soft so as to yield excessively under impact and thereby permit fracture of the plastic or resin coating.

The resin surface layer and the rubber composition backing layer in the finished article should have similar coefficients of expansion so that temperature changes will not tend to warp the same. Likewise, the coefficients of expansion of such respective layers due to moisture absorption should be substantially equivalent or warpage may result under conditions of use.

The rubber backing composition will ordinarily contain a considerable percentage of filler materials, and these should be selected both as to type and quantity to give the rubber backing material a maximum of impact strength while not seriously reducing flexibility. The plastic or resin layer or layers will ordinarily be applied in the form of plastic or resin impregnated sheets of paper, and the paper stock employed should also be selected to afford maximum impact strength while nevertheless being very thin for maximum flexibility. I have found that my rubber composition backing layer is unexpectedly efficient as a heat dissipating means in contrast to the synthetic surface layer. For this reason also, such paper stock should be as thin as possible consistent with other desired characteristics in order not to interfere with heat transfer from the plastic surface to such backing layer. When the various materials have been properly selected, bonded and cured, the resultant article is remarkably resistant to cigarette burns and the like, the heat being immediately transmitted to the underlying backing layer and absorbed and dissipated by the latter.

The resins employed to impregnate the paper stock superimposed upon the rubber composition backing layer should be relatively low in volatiles to obtain maximum impact strength and dimensional stability of the thin surface layer in the finished article. The volatile content should not, however, be so low that flow of the uncured resin under pressure is excessively reduced since an inferior surface finish would result. The curing rate should not be so fast since the resulting surface would then tend to be brittle, and a resin or resins having a rate of cure comparable to that of the backing layer should be selected for reasons explained above.

Referring now more particularly to the annexed drawing and especially Figs. 1 and 2 thereof, I prefer to manufacture my novel laminated sheet material by superimposing a layer or layers of synthetic resin impregnated paper 1 upon a relatively thick sheet 2 of uncured rubber composition and to form a stack of such assembled sheets with polished metal plates such as plates 3, 4, 5, 6, and 7 interposed therebetween. It is of particular importance that the plates 3, 5, and 7 of the stack illustrated in Fig. 1 have flat surfaces which may be polished to any desired finish from dull to mirror bright engaging the respective resin layers 1 in order that a uniform surface of proper finish may be produced in the finished article. The plates interposed between the sheets of uncured rubber stock need not be polished but should be reasonably flat and true. The number of sets of such sheet assemblies and interposed metal plates comprising the stack is a matter of choice and convenience. Such stack is then subjected to a uniform pressure in a press between hot rolled steel plates P and double layers of heavy duck D, and the resin and rubber composition layers cured while such pressure is maintained thereon. After curing and release of the molding pressure, the stack may be disassembled and the finished laminated sheet material stripped from the respective interposed metal plates. As previously indicated, the uncured rubber composition layer will have been selected so that no substantial flow of the same will occur when subjected to the aforesaid molding pressure despite the fact that the edge portions of such layer are not laterally confined. It is desirable to provide an appropriate lubricant such as those commonly employed for releasing rubber articles from molds to the metal plates interposed between the rubber layers to prevent sticking of the latter thereto, but no such lubricant will ordinarily be applied to the highly polished metal plates interposed between the synthetic resin layers.

The molding pressure applied to the stack may be relatively low per unit area inasmuch as the uncured rubber layers will yield to a certain extent and more or less resiliently support the respective resin layers against the polished metal surfaces to afford the desired smooth finish. A molding pressure on the order of about 550 to 750 lbs./sq. in. will generally be found sufficient, in contrast to pressures well in excess of 1000 lbs./sq. in. commonly employed in the molding of all-plastic layer laminates. After stripping the cured laminated sheets, which may be of very large area, from the metal plates, ordinarily of steel, the edge portions of such sheets may then be trimmed to remove any slight irregularities resulting from any slight flow of the rubber composition. Ordinarily, it will be necessary to trim away a strip only about ½ inch in width from the respective edges of the sheet.

Now referring more particularly to Fig. 2 of the drawing, a somewhat similar stack of polished metal plates and laminated resin and rubber composition layers is there illustrated. In carrying out the process in accordance with this embodiment, I superimpose the layers of synthetic resin impregnated paper 1 and rubber composition 2 with a sheet of cellophane or a layer of zinc stearate powder 8 between adjacent layers of the rubber composition 2 to prevent the latter from adhering together and employ the polished metal plates such as plates 9, 10 and 11 only between the adjacent synthetic resin layers. It will, of course, be appreciated that here again the number of sets of assembled layers and metal plates thus superimposed in a single stack will depend only on operational conveneince. Molding pressure will be applied and the laminated sheet material cured as above explained and the finished sheets then stripped from the polished metal plates and trimmed as before.

As shown in Fig. 4, a feather edge or radius 12 may be formed on the composite sheet by molding in a closed mold having an appropriate mold section. The edge of the plastic impregnated paper layer is caused to extend very slightly beyond the edge of the rubber composition sheet upon which it is superimposed so that the plastic layer may be brought down over the edge of the rubber upon closing the mold. The small amount of plastic flash extending beyond the radius thus produced will be ground or trimmed away after curing. It will be noted that the thickness of the plastic layer is not affected. Such edges are very desirable in affording a finished appearance where the composite sheet is caused to overlie the edge of a sink, for example, but obviously cannot be obtained with the usual laminates consisting entirely of sheets of resin impregnated paper.

Both Figs. 3 and 4 show only the principal layers (rubber composition backing layer and plastic surface layer) comprising my new laminated sheet material. However, as diagrammatically indicated in Fig. 5, such plastic surface layer may actually be formed of a number of plies of resin impregnated paper such as, for example, a first ply overlay 13 of very thin paper impregnated with a resin which may be of the melamine formaldehyde type, a second ply 14 of decorative paper stock likewise impregnated with a melamine formaldehyde resin and a third layer 15 comprising a double ply of paper impregnated with a phenol formaldehyde resin which has been found to bond exceptionally well to the underlying rubber composition base layer 16. It is, moreover, considerably cheaper than the melamine resin which is preferred for the outer surface due to its exceptional color range, color stability, and hardness. When cured under application of heat and pressure as above described, the various plies are bonded together and to the underlying rubber composition base, the topmost ply 13 becoming substantially transparent and disclosing the decorative paper stock of the second ply 14 therethrough. No adhesive layer of rubber cement or equivalent bonding agent is required between the resin impregnated plies 15 and the rubber composition base, and in fact the employment of any such adhesive is generally undesirable due to the relatively high volatile content of the same.

The following is a typical example of a composition found suitable for use as the base layer:

|  | Parts |
|---|---|
| High styrene resins | 20 |
| Crude rubber | 60 |
| Whole tire reclaim | 80 |
| Modified processing oil | 2 |
| Stearic acid | 4 |
| Hard still residues | 30 |
| Carbon black | 85 |
| Hard clay | 60 |
| Zinc oxide | 3 |
| Sulphur | 3 |
| Accelerator—benzothiazol disulphide | 1.50 |
| Total | 348.50 |

I have found it most desirable thus to include a certain proportion of styrene resins in such base composition since the same tend to increase the hardness of such composition somewhat without appreciably increasing the curing temperature or curing time required. Furthermore, such resins at the same time somewhat increase the flow characteristics of the rubber stock, and the inclusion of the proper proportion of the same makes it possible to obtain sufficient flow to facilitate molding of the laminated sheet without, however, increasing such flow characteristics to the point where it should be necessary laterally to confine the material to prevent excessive spreading under the molding pressures imposed. Such styrene resins are, moreover, compatible with the resins employed to impregnate the paper plies and assist in forming an excellent bond therewith without the formation of gas blisters frequently resulting when adhesives containing volatiles, for example, are employed. Typical styrene resins suitable for incorporation with the rubber base composition are the styrene and iso-butylene copolymers, and the styrene-butadiene copolymers (in a ratio of from 15 parts butadiene to 85 styrene, to 30 parts butadiene to 70 parts styrene). These are highly compatible with the base layer elastomers. Trade names of certain commercially available styrene resins include Butaprene SL, Darex Copolymers No. 3 and X-34, Marbond S and S-1, and Pliolite S-3 and S-6.

In a typical laminate assembled as illustrated in Fig. 5 and described above, the overlay ply 13 may, for example, have a thickness of .0035 inch, the print ply a thickness of .007 inch, the double ply 15 a thickness of .014 inch and the rubber composition base layer 16 a thickness of .038 inch giving a total of .0625 inch, these being the thicknesses of the respective plies in the finished article subsequent to the molding and curing operations. The various plies are, of course, considerably thicker when first assembled prior to the molding operation, the ornamental patterned paper included in the second ply 14 commonly being alpha paper or the like which is quite absorbent and adapted to be considerably compressed during molding. It will be noted that the laminated sheet material of my invention is thus much less thick than prior plastic laminates now on the market. In fact, the total thickness of the resin layer 1 will ordinarily range from about .025 inch to .040 inch in thickness. While in the specific example mentioned, the thickness of the rubber base layer in the finished article may be on the order of .040 inch, it is possible to vary the thickness of such layer over a considerable range if the flow characteristics of the uncured material are carefully controlled. As above pointed out, the thicker such base layer, the greater the tendency for the same to flow excessively during the molding operation. Accordingly, when the rubber (or other elastomer) composition is of a thickness of .040 inch, it should flow only slightly upon imposition of a molding pressure of 500 to 750 lbs./sq. in. (the range I usually employ). Generally speaking, if the total thickness of the resin layer in the finished article is appreciably less than .025 inch, the resultant laminated sheet will have poor impact resistance, and such resin coating will be readily fractured. On the other hand, if the total thickness of such resin layer in the finished article is much more than .040 inch, the resultant sheet material will no longer be flexible enough to conform closely to the ordinary "flat" supporting surfaces to which the same is applied. Furthermore, if such resin layer becomes too thick, it becomes more susceptible to cigarette burns and the like since the heat therefrom will not be so readily transmitted to the underlying rubber composition base.

For many purposes, my finished sheet material should be approximately $\frac{1}{16}$ inch thick (.0625 inch), as best conforming to standard specifications and fitting the usual edging strips and the like. Such material may be of a considerable thickness range, however, obtained primarily by varying the thickness of the elastomer backing layer since the synthetic resin layer must be held within narrow limits, as above indicated. For flexible sheet materials suitable for surfacing counters, for example, the elastomer backing layer will ordinarily be from .025 to .060 inch in thickness, although under unusual circumstances such layer may be as thin as .010 inch. The maximum thickness of such backing layer without encountering difficulty in open stock molding is about .090 inch. If closed molds are employed, however, the backing layer may be ¼ inch thick, for example, although such thick sheets will not ordinarily be required. Since the plastic surface layer remains very thin and the elastomers employed are relatively inexpensive, the cost of the resultant product is not greatly increased by such increase in total thickness.

As indicated in Fig. 6, for certain purposes the laminated sheet material of my invention may comprise an inner base layer of the rubber-like composition with decorative synthetic resin layers bonded to both surfaces thereof. Such composite laminated sheets are relatively rigid and odor-resistant while retaining the other advantages, such as resistance to impact, rendering them very suitable for use as panels in refrigerators, for example. Also, as shown in Fig. 7, the Fig. 3 form of my new material may be bonded to a thin flat metal sheet 17 adapted subsequently to be bent to desired shape without harm to such surfacing material. The applied thin surfacing material is not only decorative but serves to protect the metal from corrosion. The sound-deadening effect is also considerable. Other uses and adaptations of my new material will be obvious to those skilled in the art. When more elaborate shapes and contours are desired, the sheet metal backing will be preformed and the other layers bonded thereto.

The term "rubber and rubber-like compositions" as used herein is intended to include natural rubber, appropriately compounded, and also the various synthetic rubbers. Neoprene (a chloro-butadiene polymer such as a polymer of 2-chloro-butadiene-1,3) is a well-known example of such synthetic rubbers, as are the GRS (butadiene-styrene copolymers) and Buna-N (butadiene-acrylonitrile copolymers) rubbers. Those skilled in the art are familiar with the methods regularly employed to modify and control the characteristics of such compositions to obtain specified desired qualities. In general, my composite sheet materials may be cured in the usual manner by heating the same at a temperature on the order of 300° F. for a heating and cooling cycle totaling about 50 minutes depending on the number of composite sheets cured together at one time. Such cycle comprises about 35 minutes' heating and 15 minutes' cooling.

The synthetic resins or plastics which I prefer to employ to provide the thin surface coating of my new sheet material include:

Phenol-formaldehyde resins
Urea-formaldehyde resins
Melamine-formaldehyde resins
Various combinations of such resins Thermosetting resins of the types specifically identified are preferred as being most compatible with the rubber composition layer both as regards bonding thereto and also as regards curing properties.

The use of resin-impregnated paper stock to build up laminated materials is, of course, well known in the art. Various other fabrics, including cloth, may be similarly impregnated and employed, but paper is preferred because of its low cost and general suitability. Crepe paper is especially satisfactory in some cases.

In the preferred method of saturating a sheet of paper with the resin or plastic, such sheet is passed through a bath of the same in a proper state of fluidity, then squeezed to ensure thorough penetration, and baked to transform the absorbed resins to its intermediate set state (e. g. the so-called B-stage in the case of a phenol-formaldehyde type).

My new laminated sheet materials will usually be molded in large flat sheets sufficiently flexible to conform readily to the surfaces on which they are to be mounted. As explained above, such sheets may be bonded to a thin metal backing so as to be self-supporting or substantially self-supporting when subsequently deformed. Such metal backing may be heavy enough to permit the laminated product to be employed for cabinet tops, for example. It is, of course, possible, by employment of appropriate molding plates, to mold my new laminated sheet material to desired conformation when first producing the same so that such material will more readily fit the supporting surface to which it is to be applied. If desired, the decorative surface of the sheet may be molded with a mold plate adapted to give an embossed effect thereto.

Instead of sheets of paper, as described, certain other materials such as fiber sheets, or fiberglass fabric, for example, may be impregnated with a thermosetting resin for employment in accordance with my invention. When my new sheet material is bent on an outside bend, the rubber layer will compress somewhat in the plane of the sheet, reducing the stress on the plastic surface layer and preventing fracture of the same.

The plastic surface of my new laminate is formed, as explained, of a very thin layer of thermosetting synthetic resin bonded to an underlying supporting layer of a generally resiliently deformable and flexible elastomer. By the term "elastomer" I intend to include natural rubber, the synthetic rubbers, and rubber-like compositions.

My new sheet material may be applied to wood, fibreboard, metal, pressed board or plaster surfaces and the usual thin sheets may be cut with heavy scissors. Linoleum cements are satisfactory adhesives for adhering the sheets to such surfaces. When employing a cement including volatile solvent, sufficient drying time must be allowed before joining the surfaces, to prevent gases from subsequently forming a pocket between the supporting surface and sheet. A hand roller may be employed to press down the applied sheet, eliminating any air and ensuring intimate contact. Alternatively, my new sheet material may be laid up in a press for application to the supporting surface, this being conventional in the case of ordinary prior art laminates, and American Cyanamid Urac cement (urea formaldehyde resin adhesive) has been found to be a suitable adhesive for this type of work. If heat and pressure are to be applied, Koppers Corp. Penacolite cement (a resorcinol adhesive) is effective.

Other modes of applying the principle of the invention may be employed, change being made as regards the details described, provided the features stated in any of the following claims or the equivalent of such be employed.

I therefore particularly point out and distinctly claim as my invention:

1. As a new article of manufacture, a thin flexible decorative laminated sheet material adapted to be mounted on a generally flat supporting surface, comprising in sequence a hard smooth outer transparent surface layer of a melamine formaldehyde resin impregnated paper, a next underlying layer of decorative paper impregnated with a melamine formaldehyde resin, a third layer comprising a double ply of paper impregnated with a phenol formaldehyde resin, and a base layer of a flexible resiliently deformable elastomer, all said layers being directly united together and said outer resin layer having a smooth hard surface, the total thickness of the synthetic resin layer being from .025 to .040 inch and the thickness of the elastomer layer being from .025 to .060 inch in thickness.

2. As a new article of manufacture, a thin flexible decorative laminated sheet material adapted to be mounted on a generally flat supporting surface, comprising in sequence a hard smooth outer transparent surface layer of a melamine formaldehyde resin impregnated paper, a next underlying layer of decorative paper impregnated with a melamine formaldehyde resin, a third layer comprising a double ply of paper impregnated with a phenol formaldehyde resin, and a base layer of a flexible resiliently deformable elastomer, all said layers being directly united together and said outer resin layer having a smooth hard surface, the total thickness of the synthetic resin layer being from .025 to .040 inch and the thickness of the elastomer layer being from .010 to .090 inch in thickness.

3. As a new article of manufacture, a thin flexible decorative laminated sheet material adapted to be mounted on a generally flat supporting surface, comprising in sequence a hard smooth outer transparent surface layer of a melamine formaldehyde resin impregnated paper, a next underlying layer of decorative paper impregnated with a melamine formaldehyde resin, a third layer comprising a double ply of paper impregnated with a phenol formaldehyde resin, and a base layer of a flexible resiliently deformable elastomer, all said layers being directly molded together and said outer resin layer having a smooth hard surface, said transparent outer surface layer having a thickness of about .0035 inch, said next decorative layer a thickness of about .007 inch, said double ply layer a thickness of about .014 inch, and said elastomer layer a thickness of about .038 inch.

4. As a new article of manufacture, a thin flexible decorative laminated sheet material adapted to be mounted on a generally flat supporting surface, comprising in sequence a hard smooth outer transparent surface layer of very thin paper impregnated with a hard transparent thermosetting synthetic resin, a next somewhat thicker underlying layer of decorative alpha paper impregnated with a compatible transparent thermosetting synthetic resin, a third still thicker layer of paper impregnated with a thermosetting synthetic resin compatible with the resin of said last layer and also with rubber compositions of high styrene resin content, and a base layer of resiliently deformable rubber composition of high styrene resin content, all said thermosetting synthetic resin layers together totalling from .025 to .040 inch in thickness and being directly bonded together and to said rubber composition base layer, all said layers having similar coefficients of expansion and curing times.

5. As a new article of manufacture, a thin flexible decorative laminated sheet material adapted to be mounted on a generally flat supporting surface, comprising a hard smooth outer surface layer containing a melamine formaldehyde resin, an inner layer containing a phenol formaldehyde resin, and a base layer of resiliently deformable rubber composition containing high styrene resins to render the same compatible with said phenol formaldehyde layer, all said layers being bonded together into a unitary sheet.

6. As a new article of manufacture, a thin flexible decorative laminated sheet material adapted to be mounted on a generally flat supporting surface, comprising a hard smooth outer surface layer containing a melamine formaldehyde resin, an inner layer containing a phenol formaldehyde resin, and a base layer of resiliently deformable rubber composition compatible with said latter resin-containing layer, all said layers being bonded together into a unitary sheet.

7. As a new article of manufacture, laminated sheet material comprising a thin metal sheet, a layer comprising a resiliently deformable elastomer bonded thereto from .025 to .060 inch in thickness, and a hard smooth outer surface layer comprising synthetic thermosetting resin bonded to said intermediate elastomer layer, said resinous layer being from .025 to .040 inch in thickness.

8. As a new article of manufacture, laminated sheet material comprising a thin metal sheet, a layer of resiliently deformable elastomer bonded thereto, and a continuous thin hard outer surface layer comprising synthetic thermosetting resin bonded to said intermediate elastomer layer, said resinous layer being from .025 to .040 inch in thickness.

9. The method of forming thin laminated sheet material which comprises superimposing a thin sheet of uncured elastomer composition and a sheet of paper impregnated with an uncured thermosetting synthetic resin, stacking a plurality of such sets of superimposed sheets with polished metal molding plates interposed between opposed resin impregnated paper sheets of adjacent sets and adherence-preventing material interposed between adjacent opposed elastomer sheets, applying a molding pressure of from about 500 to about 750 lbs./sq. in. on such stack to bond such superimposed resin and elastomer sheets together, heating to a temperature on the order of 300° F. to cure such material while maintaining such pressure, releasing such pressure, and separating the resultant laminated sheets from each other and such molding plates, such uncured elastomer composition being compounded to flow only very slightly under such molding pressure to support such resin sheets uniformly against the polished surfaces of such molding plates without however, requiring to be laterally confined.

10. The method of forming laminated sheet material which comprises superimposing a layer of an uncured elastomer composition and a thin layer of a thermosetting synthetic resin, stacking a plurality of such sets of superimposed layers with polished molding plates interposed between opposed resin layers of adjacent sets and adherence-preventing material interposed between adjacent opposed elastomer composition layers, heating sufficiently to cure such material while applying molding pressure on such stack to bond such superimposed layers together and to form a smooth outer surface on such resin layers, releasing such pressure, and separating the resultant laminated sheets from each other and such molding plates, such uncured elastomer composition being selected to flow only very slightly under such molding pressure to support such resin layers uniformly against the polished surfaces of such molding plates without however requiring to be laterally confined.

11. The method of forming laminated sheet material which comprises superimposing a layer of an uncured elastomer composition and a thin layer of a thermosetting synthetic resin, molding such superimposed layers under heat and pressure with such resin layer against a highly polished surface, and stripping the resultant unitary laminated sheet from such surface, such uncured elastomer composition being selected to flow only very slightly under such molding pressure to support such resin layer firmly and uniformly against such polished molding surface without however requiring to be laterally confined.

12. As a new article of manufacture, laminated sheet material comprising a thin metal sheet, a layer of a resiliently deformable elastomer bonded thereto from .025 to .060" in thickness, and a hard smooth outer surface layer containing synthetic thermosetting resin bonded to said intermediate elastomer layer, said resinous layer being from .025 to .040" in thickness and incorporating therein a sheet of very thin paper below its outer surface.

13. As a new article of manufacture, laminated sheet material comprising a thin metal sheet, a layer of resiliently deformable rubber composition bonded thereto, a next layer containing a phenol formaldehyde resin, and an outer hard, smooth surface layer containing a melamine formaldehyde resin, said rubber composition being compatible with said phenol formaldehyde resin layer and all said layers being bonded together into a unitary sheet.

References Cited in the file of this patent

UNITED STATES PATENTS

| Number | Name | Date |
| --- | --- | --- |
| 1,454,845 | Clay | May 15, 1923 |
| 1,597,539 | Novotny et al. | Aug. 24, 1926 |
| 2,002,262 | Domm | May 21, 1935 |
| 2,165,818 | Scholl | July 11, 1939 |
| 2,211,945 | Charch | Aug. 20, 1940 |
| 2,211,950 | Hershberger | Aug. 20, 1940 |
| 2,211,959 | Maney | Aug. 20, 1940 |
| 2,354,426 | Briant | July 25, 1944 |
| 2,458,886 | Weeldenburg | Jan. 11, 1949 |
| 2,496,122 | Donahue | Jan. 31, 1950 |
| 2,497,454 | Illingworth | Feb. 14, 1950 |
| 2,581,926 | Groten et al. | Jan. 8, 1952 |